United States Patent
Paul, Jr. et al.

[11] 4,000,369
[45] Dec. 28, 1976

[54] ANALOG SIGNAL CHANNEL EQUALIZATION WITH SIGNAL-IN-NOISE EMBODIMENT

[75] Inventors: James E. Paul, Jr., Anaheim; Visvaldis A. Vitols, Orange, both of Calif.

[73] Assignee: Rockwell International Corporation, El Segundo, Calif.

[22] Filed: Dec. 5, 1974

[21] Appl. No.: 529,644

[52] U.S. Cl. ............................... 179/1 P; 325/475
[51] Int. Cl.² ........................................ H04B 1/12
[58] Field of Search ......... 179/1 P, 1 VC; 325/410, 325/473, 475

[56] References Cited
UNITED STATES PATENTS

| | | | |
|---|---|---|---|
| 2,135,556 | 11/1938 | Beantand | 325/410 |
| 3,403,224 | 9/1968 | Schroer | 179/1 P |
| 3,456,198 | 7/1969 | Black | 325/475 |
| 3,555,192 | 1/1971 | Hymer | 179/1 VC |
| 3,700,812 | 10/1972 | Springett | 179/1 P |
| 3,803,357 | 4/1974 | Sacks | 179/1 P |
| 3,803,496 | 4/1974 | Groen | 325/475 |
| 3,814,856 | 6/1974 | Dugan | 179/1 VL |
| 3,831,093 | 8/1974 | Walker | 325/410 |
| 3,848,092 | 11/1975 | Shamma | 179/1 VL |
| 3,885,111 | 5/1975 | Ishigami | 179/1 VL |

*Primary Examiner*—Kathleen H. Claffy
*Assistant Examiner*—E. S. Kemeny
*Attorney, Agent, or Firm*—H. Fredrick Hamann; Rolf M. Pitts

[57] ABSTRACT

Apparatus for reducing (a) background noise in a signal channel, and (b) channel gain variations, useful with spectral analysis equipment. Two feed forward circuits are disclosed: one to enhance a signal in noise (deriving an estimated signal); the other for AGC (relative to a preselected level). Background noise is estimated as a bias level corresponding to a minimum signal level detected within a preselected interval, the duration of such interval corresponding to a spectral interval of interest. Such noise estimate is then subtracted from the noisy signal of interest to provide a compensatorily biased signal or estimated signal. The compensatorily biased or estimated signal is then subjected to compensatory gain control by employing the ratio of a reference level to a peak detected level occurring within the preselected time interval as a gain control signal.

6 Claims, 6 Drawing Figures

ANALOG SIGNAL CHANNEL EQUALIZATION WITH SIGNAL-IN-NOISE EMBODIMENT

The invention herein described was made in the course of or under a contract or subcontract thereunder with the Department of the Army.

BACKGROUND OF THE INVENTION

Much interest has been exhibited in the analysis or automatic extraction of informational content or intelligence from speech. Such automatic processing of recorded speech sounds generally employs the spectral analysis and correlation techniques in sophisticated electronic machines such as channel vocoders, automatic speech recognition, and automatic speaker recognition equipment. Such equipment subjects the spectral analyzers to various levels of performance degradation due to electrical background noise (so called "white" noise) and spectral variations in the signalling environment and signal channels. Such spectral variations may be referred to as transmission noise, comprised of "colored noise" and background tones (as distinguishing from so-called gaussian "white noise" or more practically speaking "box car" noise).

Various prior art attempts at signal reconstruction have dealt with different aspects of such multi-faceted signal distortion problem with only limited success. For example, attempts to compensatorily gain change a noisy signal (i.e., a combination of both a signal of interest plus noise) to offset spectral gain response variations in the transmission equipment, induces the gain control function to be performed upon the signal of interest as a function of the noise content while not removing such noise content. Also attempts to effect noise rejection by low-pass filtering merely rejects both noise and signal content outside a spectral region of interest while failing to suppress noise content within the spectral region of interest.

Thus, none of such prior art techniques are directed to combined compensation of a noisy speech signal for both noise content and spectral transmission variations.

SUMMARY OF THE INVENTION

By means of the concept of the subject invention, there is provided feed-forward means for effecting compensatory biasing of a noisy signal by an amount corresponding to an estimate of the noise content thereof, to obtain an estimate of the signal of interest. There is also provided compensatory gain adjustment means for adjusting the gain of the estimated signal conversely with deviations of a maximum level of the estimated signal from a preselected level.

In a preferred embodiment of the invention, noise estimating means comprising a minimum signal level detector output-coupled to a low pass filter provides an estimate of noise content in a noisy signal; while feed forward means responsive to both the noisy signal and to the noise estimate serves to bias the noisy signal to provide an estimated noise-free signal. There is also provided a filtered maximum signal level detector responsive to the estimated signal for detecting variations in the gain thereof, which variations are employed as control signals to adjust the gain of the estimated signal from a reference gain level.

Accordingly, an object of the invention is to provide compensation of a distorted signal for both noise content and gain distortion within a spectral region of interest.

These and other objects of the invention will become apparent from the following description, taken together with the accompanying drawings in which:

BRIEF DESCRIPTION OF THE DRAWINGS

FIG. 1 is a representative time history of an exemplary output for a spectral analyzer channel or the like;

In the drawings like reference characters refer to like parts.

DESCRIPTION OF THE PREFERRED EMBODIMENTS

A speech signal, $v(t)$, is a nonstationary process which, when analyzed on a short-term basis, is treated as a quasi-stationary signal. Spectral analyzers used in automatic speech processing systems such as vocoders, automatic speech recognizers, and automatic speaker recognizers generate short-term estimators of the speech energy in regions of the speech spectrum. These estimators are generally operative over intervals of 10 to 50 msec and the spectral regions, called spectral channels, are slices of the audio spectrum with band-widths typically of 200 to 500 Hz. The speech signal, $v(t)$, is thus transformed into a sequence of spectral vectors $S(t) = \{s_1(t), s_2(t), \ldots, s_m(t)\}$. Background noises observed in such applications generally are presumed to have quasi-stationary spectral characteristics which are additive in a linear process. The noise spectrum can thus be represented in channelized form as the noise vector:

$$N(t) = \{n_1(t), n_2(t), \ldots, n_M(t)\}$$

The linear combination of these processes thus yields $$S'(t) = S(t) + N(t) = \{s_1(t) + n_1(t), s_2(t) + n_2(t), \ldots s_M(t) + n_M(t)\}$$

If we assume that $N(t) = N$ for some range of $t$, $t_1 \leq t \leq t_2$, then $$S'(t) = S(t) + N \quad t_1 \leq t \leq t_2.$$

Such assumption is generally valid for background tones, equipment noise, and colored noise characteristics of the above-noted applications.

Figure 1:
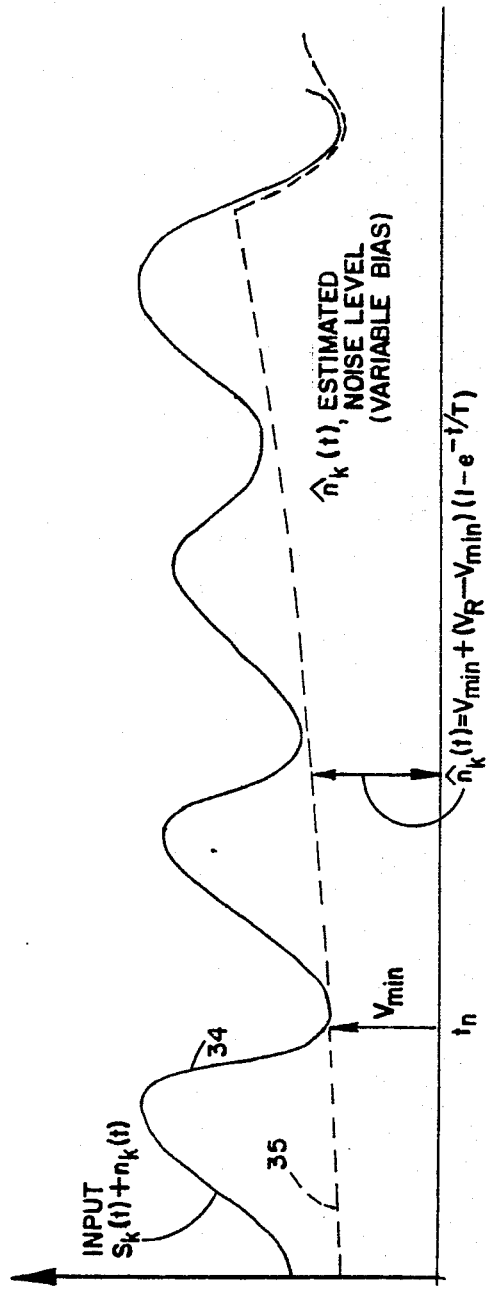

It has been observed that each of the spectral components for the speech signal reach a minimum in energy at one point in time during an interval $t_1 \leq t \leq t_2$, and has been experimentally verified for the interval $t_2 - t_1 > 2.5$ seconds. Curve 34 in FIG. 1 illustrates a representative time history of such phenomenon. The noise over the period $t_1 \leq t \leq t_2$ manifests itself on the resultant signal $S'(t)$ as a bias which can be removed by "minimum picking" (i.e., determining the minimum occurring noisy signal amplitude during such period).

A second effect to be resolved is that of spectral alteration in which the environment or channel has a non-constant gain across the speech spectrum.

This process can be modeled for the channelized case as $$S(t) = \{s'_1(t)g_1, s'_2(t)g_2, \ldots, s'_M(t)g_M \quad g_1 \neq g_2 \ldots \neq g_M\}$$

Again, the spectral gain factors are assumed stationary over some interval. This is generally true when the same channel or environment is carried through a minimum speech period.

If the gains, $g_i$, are unknown (and they are seldom explicitly measured), then the gains can be estimated and their effect neutralized by a process similar to that set forth above for noise removal. It has been observed that speech reaches some peak in each spectral channel during an observation interval or minimum speech period, as has been experimentally verified for intervals $\geq 2.5$ seconds.

The process is to locate the peak in each spectral channel during speech production over an interval $\geq 2.5$ sec and rescale the channel gain to provide peaks at some reference level as pointed out above. This process is to be carried out following background noise removal; otherwise, the background noise will introduce errors in the gain computation. A system for effecting such equalization is shown in FIG. 2.

Figure 2:
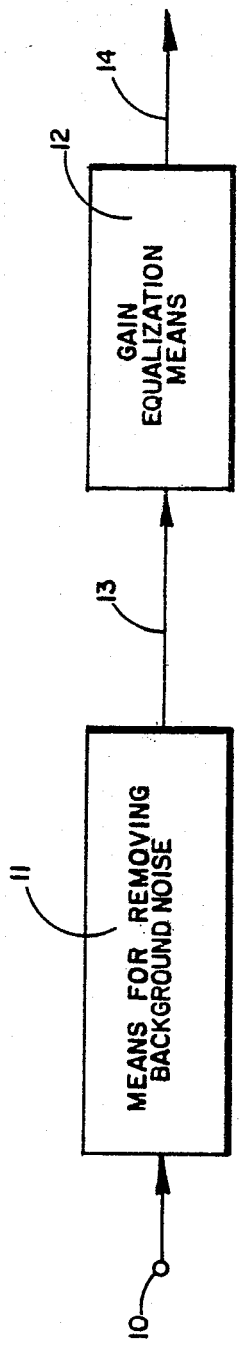
FIG. 2 is a functional block diagram of a system embodying the concept of the invention.

Referring now to FIG. 2 there is illustrated a functional block diagram of a system embodying the concept of the invention. There is provided signal channel spectral equalization means for reducing the effects of background noise and transmission noise in the spectral analysis of electrical signals transported via a signalling channel, and including means 11 responsive to an applied noisy signal of interest for distinguishing a signal component thereof from the noise content thereof based on statistical properties of the signal component and noise. There is also provided means 12 responsive to the output 13 of element 11 for compensatory spectral adjustment of the gain of the signal component so distinguished and appearing at the output 13 of element 11.

Figure 3:
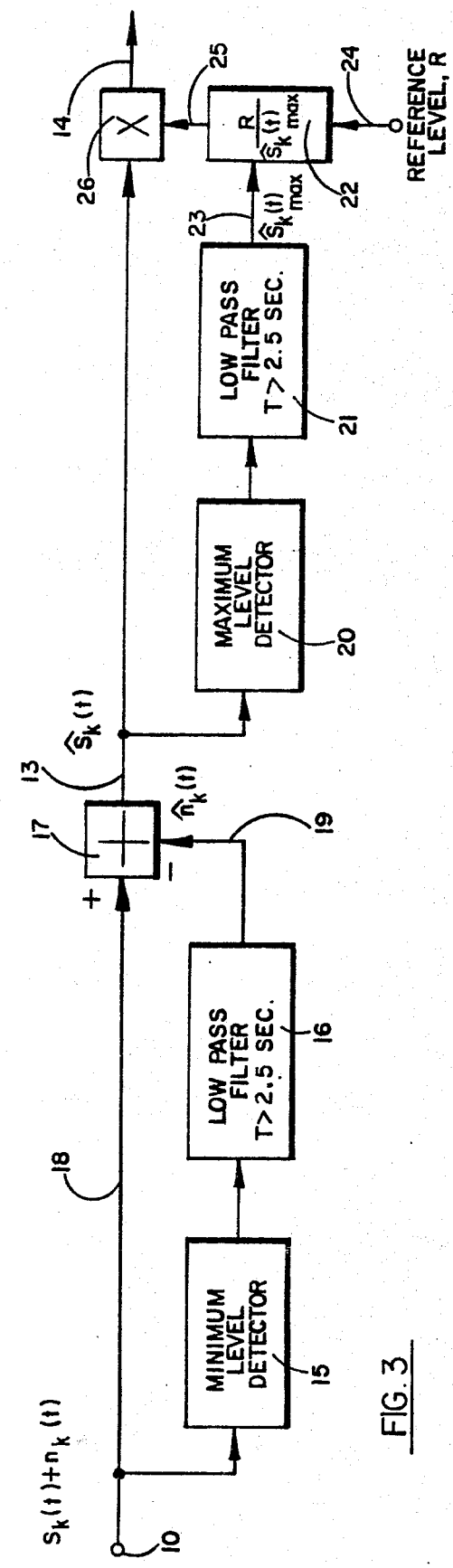
FIG. 3 is a block diagram illustrating the arrangement of FIG. 2 in fuller detail.

Elements 11 and 12 of the signal equalization device of FIG. 2 are shown in greater particularity in FIG. 3.

Referring to FIG. 3, there is illustrated in further detail the arrangement of FIG. 2. There is illustrated a signalling channel including feed forward signalling means corresponding to element 11 of FIG. 2 and comprising a minimum signal level detector 15 for detecting a minimum signal level occurring on terminal 10, and having an input coupled to the input 10 of the signalling channel. A first order low pass filter 16 having a preselected minimum time constant is input-coupled to an output of detector 15. The feed forward means further includes signal comparator means 17 having a first and second input 18 and 19 responsively coupled to a respective one of input terminal 10 and an output of filter 16 for providing an output indicative of the amplitude difference between the inputs to comparator 17.

The arrangement of FIG. 3 also includes compensatory gain adjustment means corresponding to element 12 of FIG. 2 and comprising a maximum signal level detector 20 responsive to the output 13 of comparator 17 for detecting a maximum signal level occurring over a preselected time interval. A first order low pass filter 21 (having a like time constant as element 16) is input-coupled to an output of maximum level detector 20. There is also provided signal ratio means 22 having a first input 23 coupled to an output of filter 21 and a second input 24 adapted to be coupled to a source of a reference level signal for providing an output indicative of the ratio of the reference level signal divided by the output signal from filter 21. Such ratio signal is then applied as a gain-control signal to input 25 of a gain-control element 26 such as a signal multiplier having a second input coupled to output 13 of element 17 for providing an output on line 14 indicative of the product of the signal inputs applied to signal multiplier 22. In other words, the gain of the signal transmitted from line 13 to line 14 is varied inversely with variations in the control signal on line 23.

In normal operation of the above-described arrangement, the minimum signal level detection and low pass filtering of such detection, as effected by the cooperation of elements 15 and 16, serves to provide an estimate of the noise level or non-informational energy content occurring within an information-bearing spectral region of interest for the signal applied to terminal 10. Such estimated noise level as applied to input 19 of comparator 17 serves to bias the signal on line 18, whereby an estimated (noise-free) signal output occurs on line 13.

Maximum level detector 20 and low pass filter 21 cooperate to provide a signal level indicative of the statistical gain of the estimated signal within the spectral region of interest while gain control means 26 compensatorily varies the gain of the estimated signal transmitted from line 13 to line 14 in response to variations in the gain observed on line 13. In other words, the gain of the estimated signal on line 14 is varied inversely with variations in the statistical signal level on line 13.

Thus, it is seen that the arrangement of FIG. 3 cooperates to provide an estimated signal which has been compensatorily biased to remove background noise and gain-compensated for transmission spectral smear or variations in transmissivity.

Figure 4:
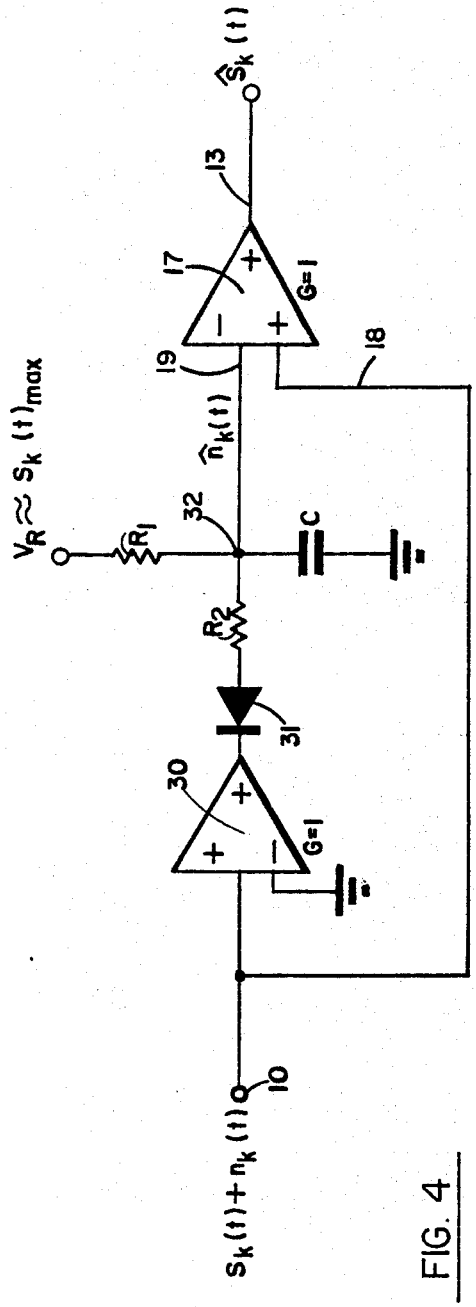
FIG. 4 is a schematic diagram illustrating the noise compensation means of FIG. 3 in greater particularity.

The construction, arrangement and cooperation of elements 15, 16 and 17 of FIG. 3 (corresponding to element 11 of FIG. 2) are shown in more particularity in FIG. 4.

Referring to FIG. 4, there is illustrated a non-inverting impedance isolating, or buffer, amplifier 30, input coupled to terminal 10. A diode 31 couples the output of amplifier 30 to series $R_2$-C network formed by resistor $R_2$ and capacitor C and providing an output time-constant $T_c = R_2C \leq .01$ secs. at terminal 32. A resistor $R_1$ interconnects terminal 32 with a voltage source $V_R$ which corresponds to an expected maximum value for signal $S_k(t)$. The value for $R_1$ is selected to cooperate with capacitor C to provide a time constant $T_d = R_1C \geq 2.5$ sec.

There is also provided a differential amplifier or signal differencing device 17 having a first input line 18 responsively coupled to terminal 10 and a second input line 19 coupled to terminal 32, such that the output on terminal 13 thereof corresponds to the amplitude difference between the two inputs applied thereto.

In normal operation of the arrangement of FIG. 4, a time-varying noisy signal $S_k(t) + n_k(t)$, corresponding to curve 34 in the representative time history in FIG. 1, is applied to terminal 10. Increasing or maximum signal swings of the applied input are blocked by preselectively-poled diode 31, while the charge on capacitor C continues to build up in response to $V_R$ via the long time-constant effect contributed by $R_1$, illustrated by curve 35 in FIG. 1 (and corresponding to element 16 in FIG. 3). If the potential at terminal 32 should attempt to rise above the output of signal buffer 30, or if the output level of signal buffer 30 should drop below the potential on terminal 32, then terminal capacitor C will discharge through diode 31 via the short time constant provided by $R_2$ allowing the potential on terminal 32 to follow the minimums of the applied input, $V_{min}$, on terminal 10 (see curve 35 in the region $t_n$, for example, in FIG. 1), corresponding to the function of block 15 in FIG. 3. Hence, such arrangement functions as a unipolar minimum level detector. Such time-varying minimum is taken as an estimate of the noise-level $n_k(t)$ while the differential output on line 13 in FIG. 4 (corresponding to the difference between curves 34 and 35 in FIG. 1) provides an estimated signal of interest $\hat{S}_k(t)$.

The construction and arrangement of isolation amplifier 30 and differential amplifier 17 are well understood in the art, an isolation amplifier being disclosed at pages 172 and 317 of the text "Electronic Analog Computers" by Korn and Korn, published by McGraw-Hill (1956), while an exemplary differential amplifier is disclosed at pages 299, 364 and 365 of such text. Accordingly, these elements are illustrated in block form only for convenience in exposition.

Figure 5:
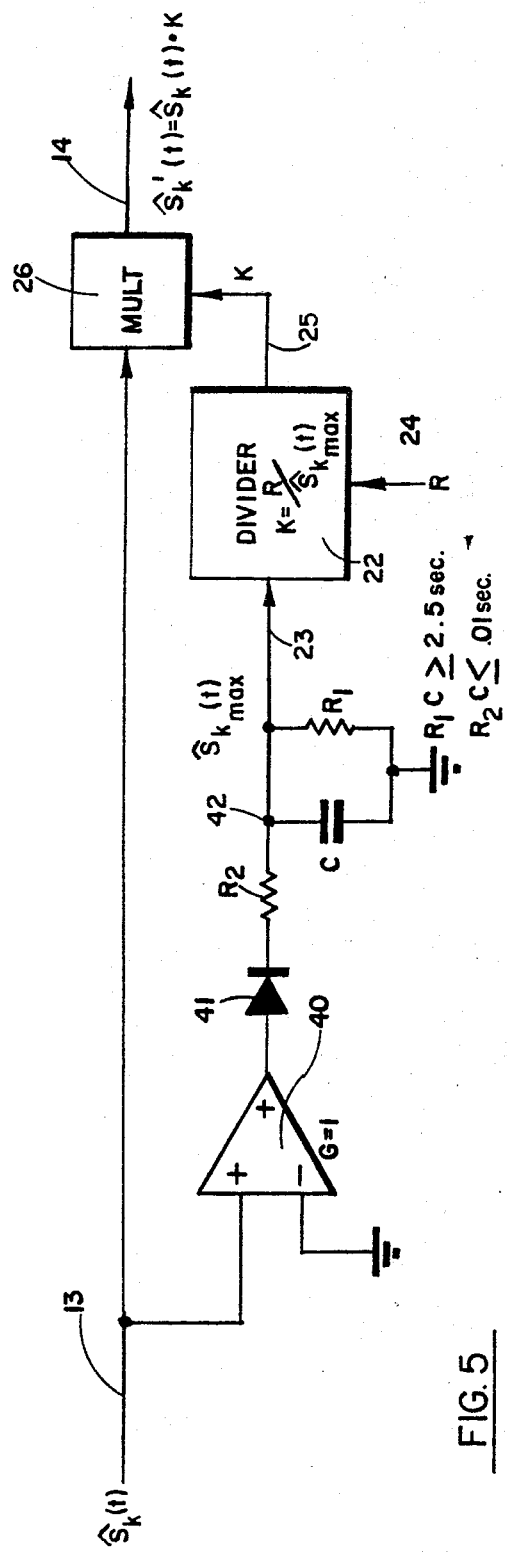
FIG. 5 is a schematic diagram illustrating the gain-compensation means of FIG. 3 in greater particularity.

The construction, arrangement and cooperation of elements 20, 21, 22 and 26 of FIG. 3 (corresponding to element 12 of FIG. 2) are shown in more particularity in FIG. 5.

Referring to FIG. 5, there is provided a buffer amplifier 40, similar to element 30 in FIG. 4 and having an input coupled to line 13. A diode 41 couples the output of amplifier 40 to an R-C network formed by a resistor $R_2$ in series with capacitor C. Resistor $R_2$ and capacitor $C_1$ form a quick charging time constant $T_c = R_2C \leq .01$ secs., while resistor $R_1$ and capacitor C cooperate to form a slow discharge time constant $T_d = R_1C \geq 2.5$ sec., similarly as the arrangement in FIG. 4. The junction 42 (interconnecting resistors $R_1$ and $R_2$ and capacitor C) is connected to the input line 23 of divider 22, divider 22 cooperating with multiplier 26 as described above in connection with the description of FIG. 3. Such devices for signal multiplication and division are well known in the art, a signal multiplier being described, for example, in Section 6.2 (including FIG. 6.3) of the above-noted text "Electronic Analog Computers" by Korn and Korn, while a signal divider employing a multiplier in feedback cooperation is shown in Section 6.3 (including FIG. 6.7) of such text. An exemplary commercially available device for such purposes is a Function Module, Model 433, manufactured by Analog Devices, Inc., of Norwood, Mass. Accordingly, elements 24 and 26 are shown in block form only for convenience in exposition.

Figure 6:
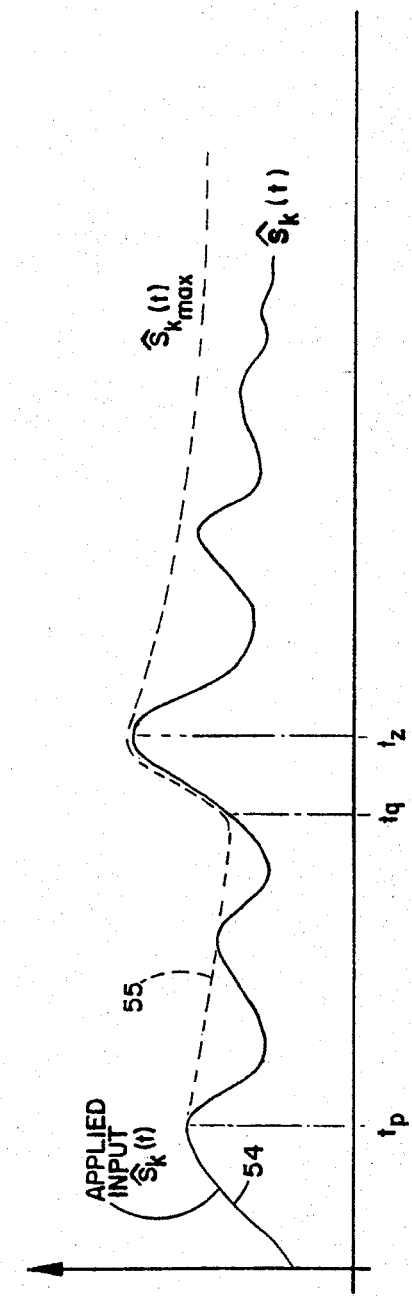
FIG. 6 is a representative time history of an exemplary response of certain elements of the device of FIG. 5.

In normal operation of the R-C network in FIG. 5, the time-varying output $\hat{S}_k(t)$ applied to line 13 (from element 17 of FIGS. 3 and 4) and corresponding to curve 54 in the representative time history of FIG. 6, is coupled through preselectively poled diode 41 to capacitor C, such that increasing or maximum signal are allowed to charge capacitor C via the short time constant effect contributed by $R_2$ (see curve 55 in the regions of $t_p$ and $t_q$ in FIG. 6). When the applied input signal (curve 54 in FIG. 6) falls below the charge potential stored in capacitor C, diode 41 prevents short-term discharge of capacitor C, while the cooperation of shunt resistor $R_1$ permits preselected long term discharging of capacitor C (see curve 55 in FIG. 6 in the interval between $t_p$ and $t_q$, for example). Accordingly, it is to be appreciated that elements 41, $R_2$ and C in FIG. 5 cooperate to provide the maximum level detection function of element 20 in FIG. 3, while elements $R_1$ and C in FIG. 5 cooperate to provide a low pass filter function of element 21 of FIG. 3. Thus, a signal corresponding $\hat{S}_{k_{max}}(t)$ is generated, which signal is then ratioed by divider 24 for compensatory gain control (via multiplier 26) of the signal $\hat{S}_k(t)$ on line 13.

Accordingly, there has been described signal equalization or compensatory processing means for reducing the effects of background noise and gain variations.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Signalling channel spectral equalization means for reducing the effects of background noise and transmission noise in the spectral analysis of electrical speech signals transported via a signalling channel and comprising in combination means responsive to an applied noisy signal of interest for distinguishing a speech signal component thereof from the noise content thereof based on statistical properties of said signal component and said noise, and means responsively coupled to an output of said means for distinguishing for compensatory spectral adjustment of the gain of said distinguished signal component, said means for distinguishing compromising feed forward signalling means including:

a minimum signal level detector for detecting a minimum signal level occurring within a preselected time interval and having an input of said signalling channel, low pass filter means comprising a first order filter having a preselected minimum time constant of at least two and one-half seconds and further having an input responsive to the output of said detector, and signal comparator means having a first and second input responsive to a respective one of said input of said signalling channel and said output of said filter means for providing an output indicative of the amplitude difference between the inputs to said comparator means.

2. Signalling channel spectral equalization means for reducing the effects of background noise and transmission noise in the spectral analysis of electrical speech signals transported via a signalling channel and comprising in combination means responsive to an applied noisy speech signal of interest for distinguishing the speech signal component thereof from the noise content thereof based on statistical properties of said signal component and said noise, and means responsively coupled to an output of said means for distinguishing for compensatory spectral adjustment of the gain of said distinguished signal component, said means for distinguishing comprising noise estimating means responsive to an applied noisy signal of interest for estimating the noise control as a bias level within a one of successive intervals of a preselected duration and corresponding to a minimum detected signal level occurring within such interval, and feed forward means responsive to said noise estimating means for compensatorily biasing said noisy signal to provide an estimated signal.

3. The device of claim 1 in which said means for compensatory gain adjustment comprises a maximum signal level detector responsive to the output of said means for distinguishing for detecting a maximum level occurring over a preselected time interval, low pass filter means comprising a first order filter having a preselected minimum time constant of at least 2 ½ seconds and further having an input responsive to the output of said maximum level detector;

signal ratio means responsive to a reference level signal and to an output of said low pass filtering means for providing an output indicative of said reference level signal divided by said output of said low pass filter, and gain control means comprising a signal multiplier having a first and second input, respectively, responsive to the output of said means for distinguishing and the output of said signal ratio means for providing an output indicative of the product of the inputs applied to said signal multiplying means.

4. The device of claim 2 in which said noise estimating means comprises a minimum signal level detector for detecting a minimum signal level occurring within a preselected time interval of substantially less than 2 ½ seconds and having an input coupled to the input of said signalling channel, and low pass filter means comprising a first order filter having a preselected minimum time constant of at least 2 ½ seconds and further having an input responsive to the output of said detectors.

5. The device of claim 2 in which said means for compensatory gain adjustment comprises a maximum signal level detector responsive to an output of said means for distinguishing for detecting a maximum level of said estimated signal occurring over successive intervals of a preselected duration of substantially less than 2 ½ seconds;

compensatory gain control means for adjusting the gain of an output of said means for distinguishing conversely with deviations of an output of said maximum signal level detector from a preselected level.

6. Signalling channel spectral equalization means for reducing the effects of background noise and transmission noise on spectral analysis of electrical speech signals transported via a signalling channel and comprising in combination a minimum signal level detector for detecting a minimum signal level occurring within a preselected time interval substantially less than 2 ½ seconds and having an input coupled to the input of said signalling channel;

first low pass filter means comprising a first order filter having a preselected minimum time constant of at least 2 ½ seconds and further having an input responsive to an output of said detector;

signal comparator means having a first and second input, respectively, responsive to said input of said signalling channel and to said output of said filter means for providing an output indicative of the amplitude difference between the inputs to said comparator means;

a maximum signal level detector responsive to the output of said signal comparator means for detecting a maximum signal level occurring over a preselected time interval;

second low pass filter means comprising a first order filter having a like preselected minimum time constant as said first filter means and further having an input responsive to the output of said maximum level detector;

signal ratio means responsive to a reference level signal and to an output of said low pass filter means for providing an output indicative of said reference level signal divided by said output of said low pass filter; and gain control means comprising a signal multiplier having a first and second input, respectively, responsive to an output of said means for distinguishing and the output of said signal ratio means for providing an output indicative of the product of the inputs applied to said signal multiplying means.

* * * * *